United States Patent [19]

Saeki

[11] Patent Number: 5,754,505
[45] Date of Patent: May 19, 1998

[54] OPTICAL DISC SYSTEM WITH AN OPTICAL DISC HAVING AT LEAST ONE CHANNEL OF A MULTIPLE CHANNEL SIGNAL RECORDED ON EACH SIDE OF A WOBBLING GROOVE

[75] Inventor: Hiroshi Saeki, Kanagawa, Japan

[73] Assignee: Sony Corporation, Tokyo, Japan

[21] Appl. No.: 233,058

[22] Filed: Apr. 26, 1994

[30] Foreign Application Priority Data

Apr. 26, 1993 [JP] Japan .................. 5-099793

[51] Int. Cl.$^6$ .................................. G11B 7/095
[52] U.S. Cl. .................. 369/44.26; 369/44.37; 369/44.13
[58] Field of Search ............. 369/44.37, 44.38, 369/44.41, 44.26, 44.14, 44.13, 111, 275.3, 275.4

[56] References Cited

U.S. PATENT DOCUMENTS

| | | | |
|---|---|---|---|
| 5,027,337 | 6/1991 | Takahashi et al. | 369/44.26 |
| 5,060,208 | 10/1991 | Nagai et al. | 369/13 |
| 5,140,577 | 8/1992 | Ohsato | 369/44.37 |
| 5,185,732 | 2/1993 | Ogawa et al. | 369/275.3 X |
| 5,303,216 | 4/1994 | Shinoda et al. | 369/44.37 |
| 5,450,381 | 9/1995 | Tsukamura et al. | 369/13 |
| 5,539,724 | 7/1996 | Ohtomo | 369/275.4 |

FOREIGN PATENT DOCUMENTS

| | | | |
|---|---|---|---|
| 0313394 | 4/1989 | European Pat. Off. | 369/44.26 |
| 0342624 A3 | 11/1989 | European Pat. Off. | |
| 0376818 A2 | 7/1990 | European Pat. Off. | |
| 0392020 A1 | 10/1990 | European Pat. Off. | |
| 0399978 A3 | 11/1990 | European Pat. Off. | |
| 0438784 A3 | 7/1991 | European Pat. Off. | |
| 0151843 | 7/1986 | Japan | 369/275.4 |
| 0046627 | 2/1988 | Japan | 369/44.13 |
| 0181023 | 8/1991 | Japan | 369/44.13 |
| 0111235 | 4/1992 | Japan | 369/275.4 |
| 0054403 | 3/1993 | Japan | 369/44.26 |

OTHER PUBLICATIONS

Patent Abstracts of Japan, vol. 17, No. 242, Abstract Date May 14, 1993, JP 4-366426 Publication Date Dec. 18, 1992, Inventor Seiji Kobayashi et al.

IEEE Transactions on Consumer Electronics, vol. 35, No. 3, Aug. 1989, K. Tachibana, T. Kashiwagi, H. Momiyama, M. Yamamoto and H. Takahashi, Corporate Research Laboratories, Sony Corporation: "Optical Disc System for Wideband High Definition Video Signal."

*Primary Examiner*—Thang V. Tran
*Attorney, Agent, or Firm*—Limbach & Limbach L.L.P.

[57] ABSTRACT

An optical disc system, an optical disc employed in such system, and an optical disc apparatus employed for driving the optical disc system, are disclosed. The optical disc includes plural wobbled grooves gr which include address information data. The optical disc is pre-formatted so that the wobbled grooves are formed so that the distance between neighboring grooves gr corresponds to the number of channels in an HDTV signal. For instance, two channels, CH1 and CH2, are recorded on recording lands are defined between the neighboring wobbled grooves formed at a distance of 3.2 μm. Signal dots $Sd_1$, $Sd_2$ for the two HDTV signal channels CH1 and CH2 are recorded on either sides of each wobbled groove gr. The HDTV signals may be recorded on the real time basis and for an extended period of time.

4 Claims, 12 Drawing Sheets

FIG.1

(PRIOR ART)

FIG.2

(PRIOR ART)

OPTICAL DISC SYSTEM WITH AN OPTICAL DISC HAVING AT LEAST ONE CHANNEL OF A MULTIPLE CHANNEL SIGNAL RECORDED ON EACH SIDE OF A WOBBLING GROOVE

BACKGROUND OF THE INVENTION

This invention relates to an optical disc system employed for recording/reproduction of signals of a broad frequency range, such as a high definition picture signal, an optical disc recording medium employed therein, and an associated optical disc apparatus.

The prior art system, from which the present invention is started, is a replay-only optical disc apparatus for high definition television signals (HDTV signals). Such a disc apparatus employs, as a reproducing medium, an optical disc in which the HDTV signals, companded along the time scale and having the frequency range set to approximately 12 MHz, are recorded on two neighboring tracks. This system employs an optical system having two signal read-out spots (beam spots) in connection with the optical disc, for reproducing the high definition television signals (HDTV signals) having a broad frequency range. Among the conventional optical disc apparatus, there is, for example, one described for example in a publication entitled "Optical Disc System for Wideband High Definition Video Signals", IEEE Transactions on Consumer Electronics, Vol.35, No.3, August 1989.

Figure 1:
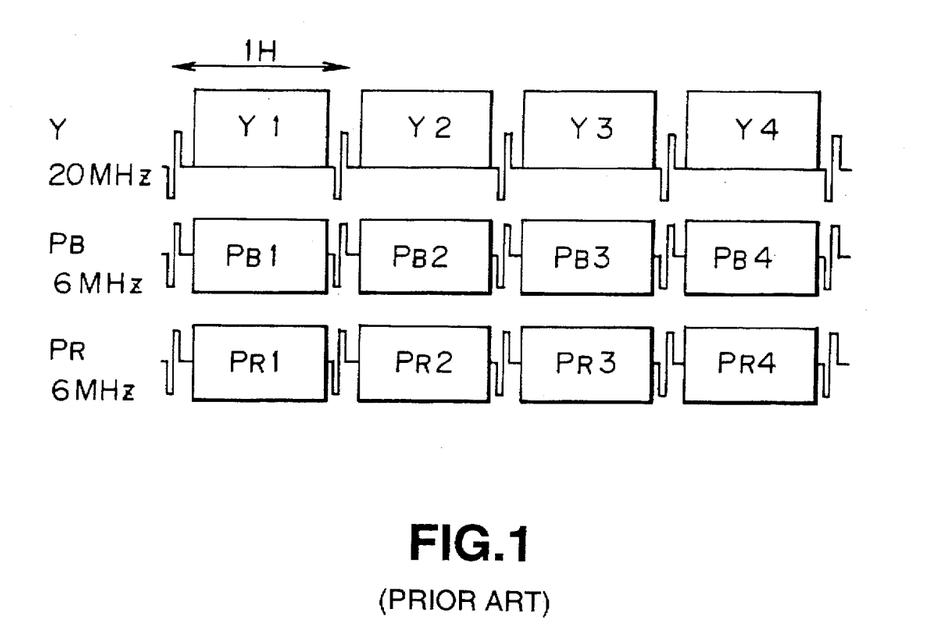
FIG. 1 is a schematic waveform diagram showing HDTV signals.
Figure 2:
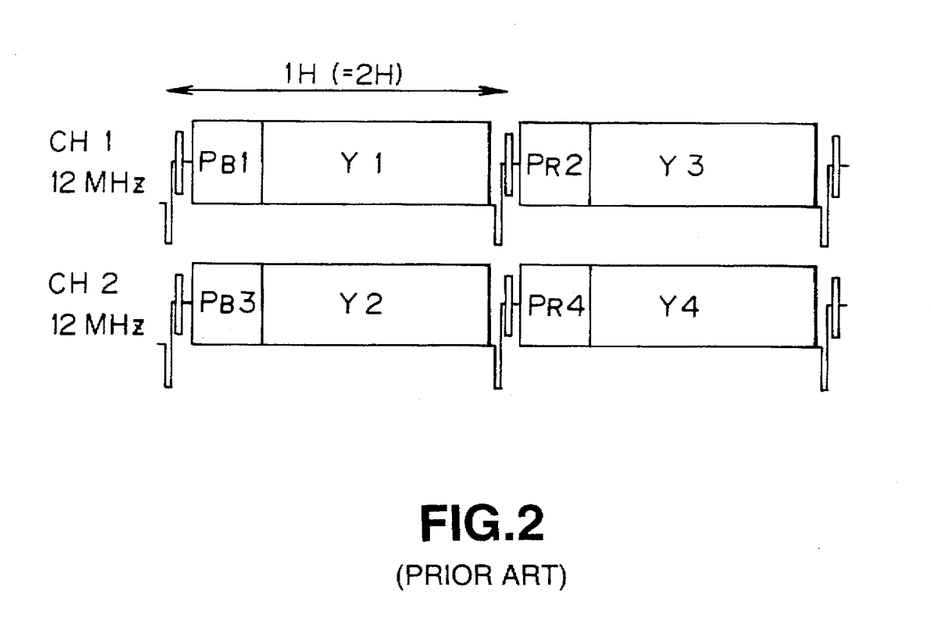
FIG. 2 is a schematic waveform diagram showing the HDTV signals as divided into two channels.
Figure 3:
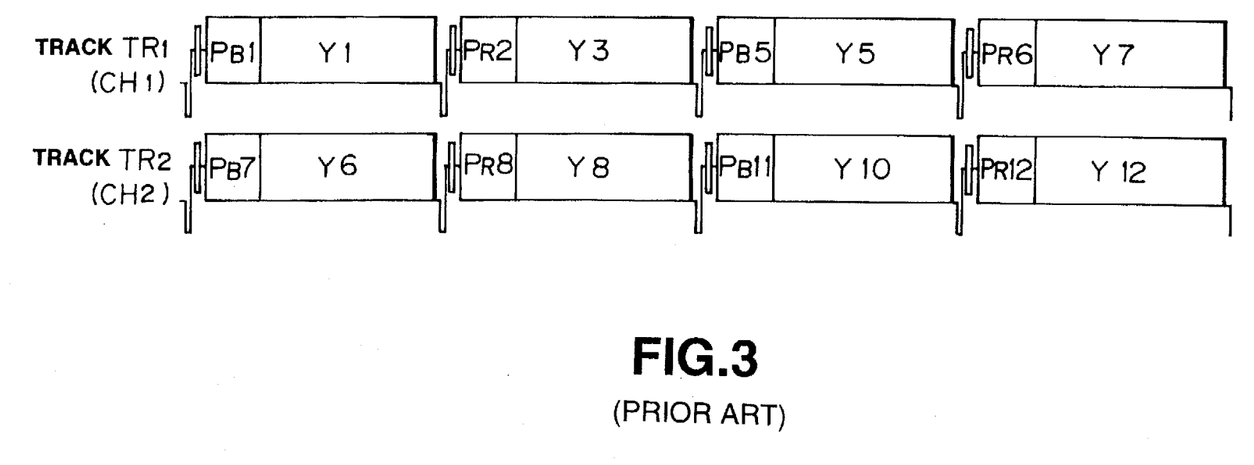
FIG. 3 is a schematic waveform diagram showing the relation between the two channels of the HDTV signals and the recording tracks of the optical disc.
Figures 4A, 4B:
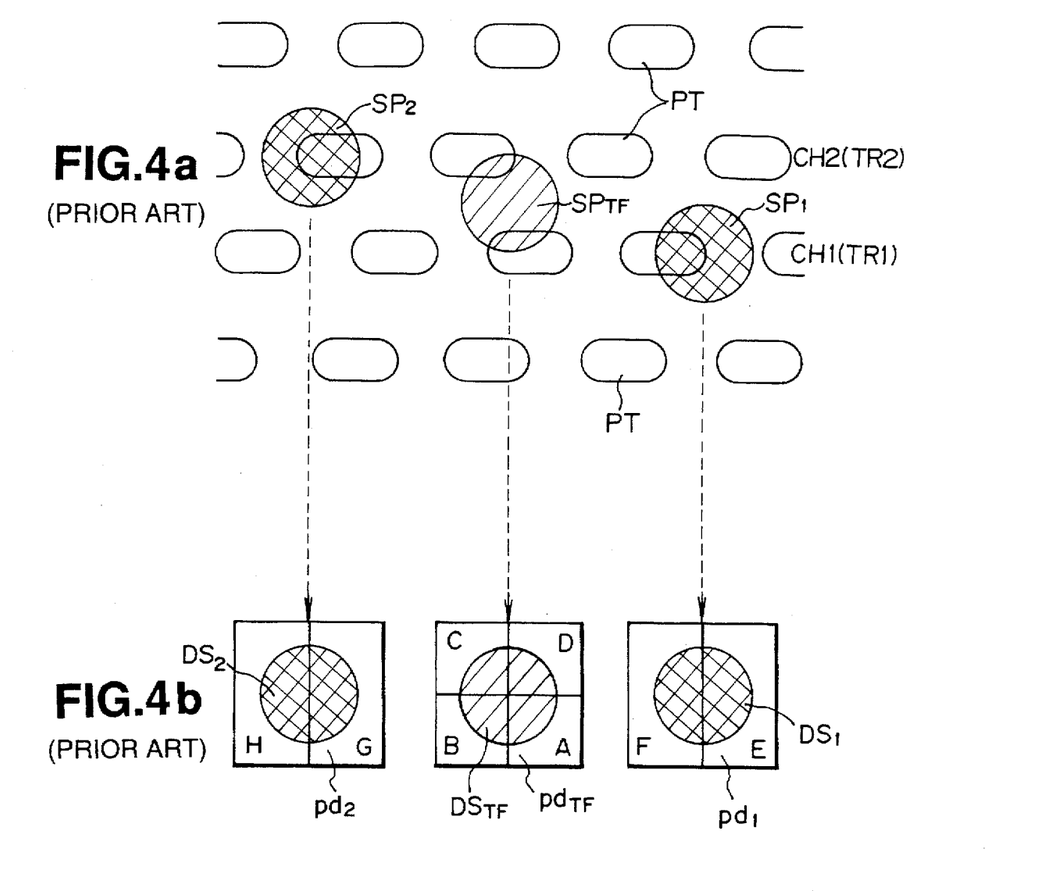
FIGS. 4(a) through 4(b) illustrate the tracking and focusing servo for a conventional optical disc.

The signals recorded on the optical disc in this Publication are 20 MHz luminance signals (Y signals) shown in FIG. 1, expanded along the time base into 12 MHz signals shown in FIG. 2, and two different 6 MHz color difference signals ($P^B$ and $P^R$ signals) shown in FIG. 1, compressed into 12 MHz signals shown in FIG. 2. These luminance signals and the two color difference signals are alternately selected on a line basis to produce two channel signals CH1 and CH2 as shown in FIG. 2. The signals of the two channels CH1 and CH2 are frequency modulated and subsequently associated with two neighboring tracks TR1 and TR2 on the optical disc as shown in FIG. 3 so as to be recorded on the optical disc as strings of pits PT (pit strings) as shown at FIG. 4(a).

For reproduction, two signal read-out and tracking error detection spots $SP_1$ and $SP_2$ are spaced apart from each other by a spacing equal to the spacing between the two pit strings. The spots $SP_1$ and $SP_2$ concentrated on the optical disc for tracing the pit strings in order to reproduce the picture signals of the two channels CH1 and CH2 and in order to detect the tracking error signals. A spot indicated $SP_{TF}$ at FIG. 4(a) is a the tracking error and focusing error detection spot.

Figure 5:
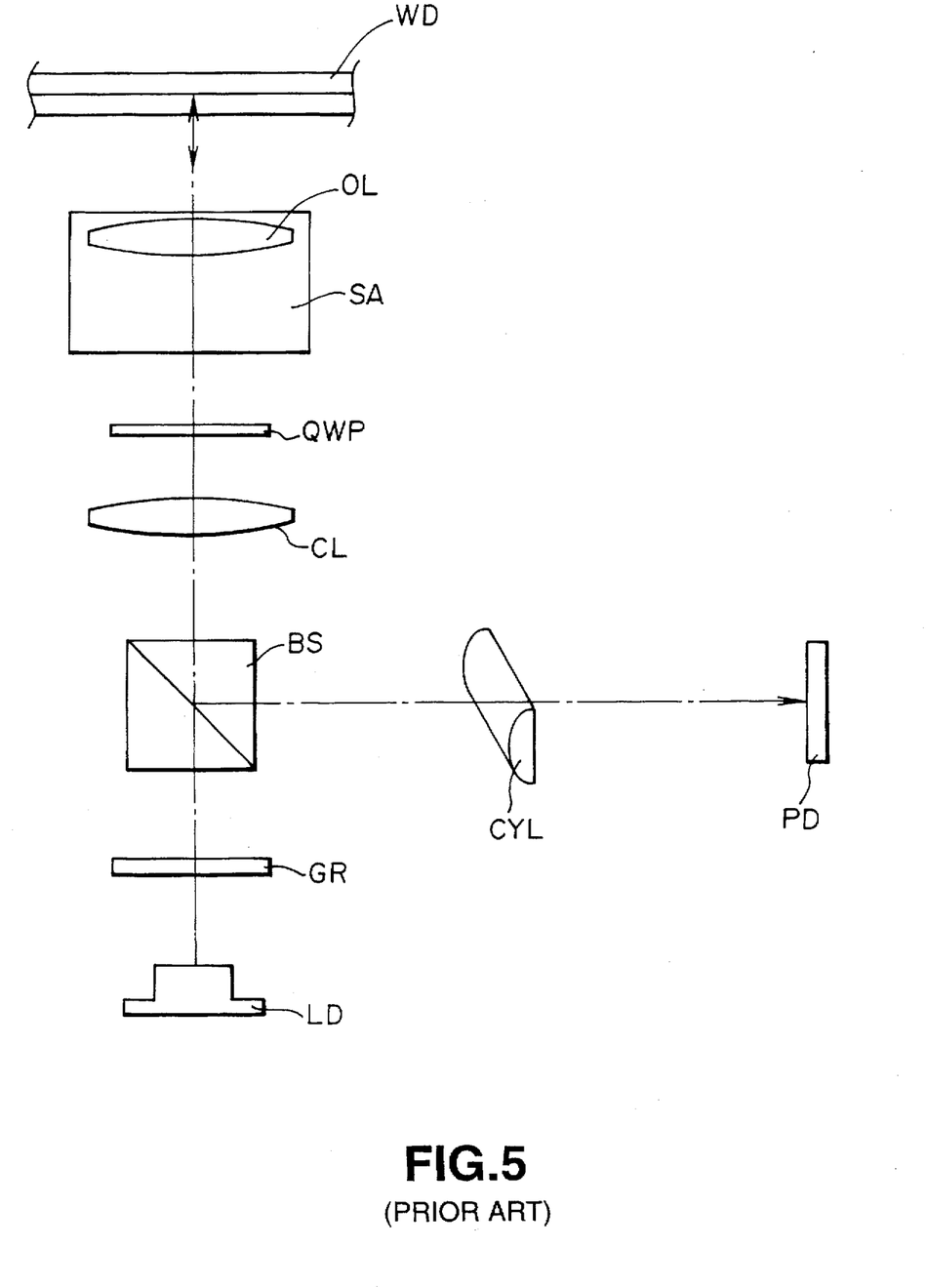
FIG. 5 is a schematic view showing an arrangement of a conventional optical disc apparatus.

An illustrative optical system for concentrating the spots $SP_1$, $SP_2$ and SPTF on the optical disc is shown in FIG. 5.

Referring to FIG. 5, a laser light from a laser diode LD, excited with direct current, is divided by a diffraction grating GR into, for example, a 0th order light and a ±1st order light. The 0th order light and a ±1st order light, transmitted via the diffraction grating GR, is transmitted through a beam splitter BS and subsequently collimated by a collimator lens CL. The collimated light is then passed through a quarter wave plate QWP and subsequently converged on a signal surface of an optical disc WD by an objective lens OL driven in horizontal and vertical directions by a servo actuator SA. The light spots of the 0th order light and the ±1st order light, converged on the signal surface of the optical disc WD, become the light spots $SP_1$, $SP_2$ and $SP_{TF}$ shown at FIG. 4(a). In the example of FIG. 4, the ±1st order light and the 0th order light, for example, are respectively used as the signal readout and tracking error detection spots $SP_1$, $SP_2$ and as the tracking error and focusing error detection spot $SP_{TF}$.

The reflected light beams of the spots $SP_1$, $SP_2$ and $SP_{TF}$ from the signal surface of the optical disc WD are transmitted through the objective lens OL, quarter wave plate QWP and the collimator lens CL and, after reflection by the beam splitter BS, are transmitted via a cylindrical lens CYL to a photodetector PD.

The photodetector PD is made up of three light receivers $pd_1$, $pd_{TF}$ and $pd_2$, with the light receivers $pd_1$ and $pd_2$ being each made up of two-segment light receiving elements E, F and G, H, respectively and with the light receiver $pd_{TF}$ being made up of four-segment light receiving elements A, B, C and D, as shown at FIG. 4(b). The light receiver $pd_1$ detects the signal for the channel CH1 and the tracking error signal, based upon the reflected light of the spot $SP_1$. Similarly, the light receiver $pd_2$ detects the signal for the channel CH2 and the tracking error signal, based upon the reflected light of the spot $SP_2$, and the light receiver $pd_{TF}$ detects the tracking error signal and the focusing error signal, based upon the reflected light of the spot $SP_{TF}$. The tracking errors are detected by a so-called differential push-pull method, with the aid of the detection signals from the light receivers $pd_1$, $pd_{TF}$ and $pd_2$.

The above-described conventional optical disc apparatus is simply intended for reproducing the 2-channel HDTV signals CH1 and CH2 recorded on the optical disc, without considering the recording.

SUMMARY OF THE INVENTION

It is therefore an object of the present invention to provide an optical system, an optical disc apparatus and an optical disc recording medium whereby the HDTV signals may be recorded on or reproduced from the optical disc satisfactorily by a simplified arrangement.

It is another object of the present invention to provide an optical disc recording medium in which plural channel signals may be recorded on either sides of a groove on the recording medium.

It is further object of the present invention to provide an optical disc system and an optical disc apparatus in which signals having a wide range of frequency, such as high definition picture signals, may be recorded and reproduced on a real time basis and for an extended period of time.

It is a further object of the present invention to provide an optical disc apparatus in which an optical system for producing tracking signals is simplified in structure.

It is a further object of the present invention to provide an optical disc apparatus in which tracking error signals freed of offset components may be produced even in cases wherein the optical disc recording medium is inclined with respect to the optical axis of the objective lens through which the laser light is incident on the optical disc recording medium.

An optical disc system according to the present invention comprises an optical disc having a recording area for recording information signals therein in the form of a number of recording lands defined between wobbled grooves each formed along one of plural recording tracks on the optical disc. The optical disc system also comprises an optical disc apparatus. The wobbled grooves include the address information, and the distance between the neighboring grooves corresponds to the width of two channels of signals.

The optical disc apparatus includes laser means for emitting a main laser beam and an auxiliary laser beam and radiating the main and auxiliary laser beams via an objective lens to the optical disc. The optical disc apparatus includes means having plural light receivers for receiving the main and auxiliary laser beams reflected from the optical disc for generating electrical signals. The optical disc apparatus includes tracking servo means for controlling the position of the objective lens responsive to the electrical signals for tracking control. The tracking control signals control the main and auxiliary laser beams on both sides of the wobbled grooves.

The laser means comprises a semiconductor laser emitting and radiating two laser beams, a collimator lens for collimating the two laser light beams radiated from the semiconductor laser, and a grating for splitting the two laser light beams incident thereon via the collimator lens into 0th order light and 1st order light.

The tracking servo means effectuates tracking servo by a differential push-pull method.

An optical disc recording medium according to the present invention comprises a plurality of wobbled grooves each having at least the address information. The distance between the neighboring grooves corresponds to the number of channels of signals. The recording medium comprises recording lands formed between neighboring wobbled grooves, with the channels of signals being recorded on both sides of the wobbled grooves. There are two channels of signals may be two according to a preferred embodiment.

The present invention also is directed to a optical disc apparatus for use with the optical disc system and the optical disc.

DESCRIPTION OF THE PREFERRED EMBODIMENTS

Referring to the drawings, illustrative embodiments of the present invention will be explained in detail.

Figure 6:
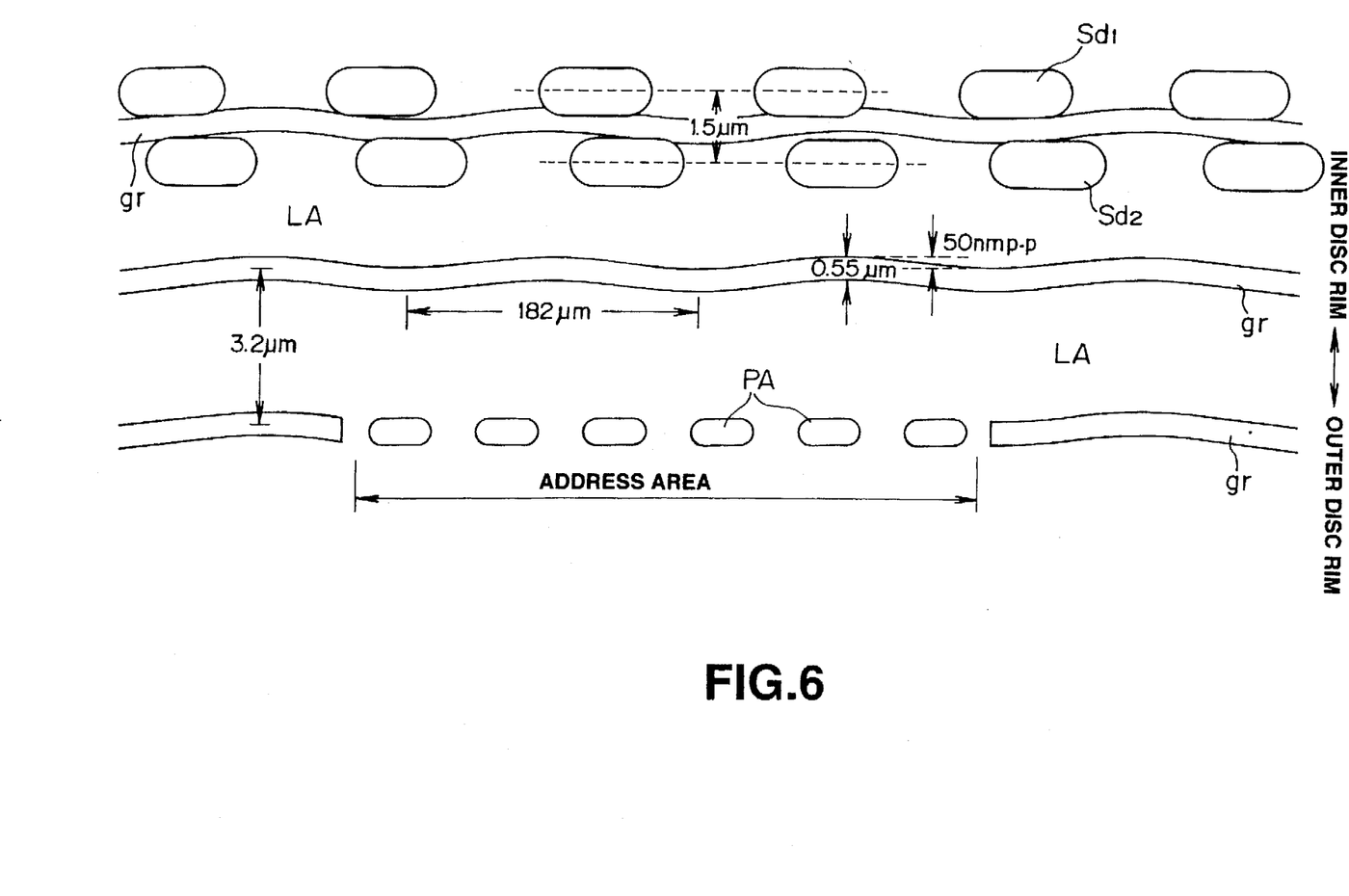
FIG. 6 illustrates signal recording and preformatting for an optical disc according to an embodiment of the present invention.

An optical disc recording medium of the present embodiment, referred to herein simply as an optical disc, is pre-formatted so that wobbled grooves gr, at least comprising the address information, are formed at an interval relative to each other which is related to the number of channels of plural channel signals to be recorded. A recording land LA is formed between the neighboring grooves gr, with the plural channel signals being recorded on each of recording lands LA formed on either sides of the grooves gr, as shown in FIG. 6.

That is, the optical disc of the present embodiment is a an alloyed write-once optical disc having, for example, a four-layer recording film. The optical disc, formed by injection molding of polycarbonate resin, includes guide grooves (the grooves gr) and the recording lands LA defined between adjacent grooves gr. The groove gr has a width of approximately 0.55 µm and a depth of approximately 0.1 µm and is formed spirally from the inner rim out to the outer rim of the disc. The pitch between the grooves gr is 3.2 µm.

The address information is recorded in the groove gr by partially interrupting the groove for forming pits PA. The address areas, each carrying the address information, appear at an interval of 30 Hz, in conformity to rotation of the optical disc WD, and each continue for approximately 40 µs.

Wobble signals are formed in the groove gr as the information for controlling the number of revolutions of the optical disc WD.

The peak to peak distance and cyclic length of the groove gr are equal to approximately 50 nm and 182 µm, respectively.

In the present embodiment, the 2-channel HDTV signals CH1 and CH2 are recorded on the pre-formatted optical disc. More specifically, the 2-channel signals CH1 and CH2 are recorded by respectively producing signal dots $Sd_1$, $Sd_2$ on either side of each groove gr for recording the two-channel signals CH1 and CH2.

It is noted that, since the two-channel signals CH1 and CH2 are recorded on the recording lands LA, the pitch between the grooves gr is selected to be 3.2 µm. With certain conventional optical discs, the pitch between the grooves gr is selected to be equal to 1.6 µm. However, since the signals of the two channels CH1 an CH2 are recorded on the recording land LA between the grooves gr, the pitch between the grooves gr is selected to be equal to two times 1.6 µm, or 3.2 µm. That is, the larger the number of channels to be recorded, the wider becomes the pitch between the neighboring grooves gr. The signal dots Sd for each channel are formed on either side of the groove gr, in the same manner as explained above.

In the present embodiment, the distance between the signal dots $Sd_1$ of the channel CH1 and the signal dots $Sd_2$ of the channel CH2 is 1.5 µm, while that between the signal dots of the neighboring channels within the same recording land LA is 1.7 µm.

FIG. 6 conceptually shows the manner of preformatting the optical disc. In the drawing, the scale in the longitudinal and transverse directions is different from the scale of the wobbling amplitude. The period of the signal dots is also significantly shorter than the wobbling period. If, for example, signals of 16 MHz are recorded, the period of the signal dots Sd is approximately 1.4 μm. The value of the wobbling period is that for the wobbling frequency of 126.5625 kHz and the constant linear velocity (CLV) of 23 m/sec. In addition, although the wobbling of a given wobbled groove is shown in FIG. 6 to be in phase with that of other wobbled grooves, the wobbling in the respective wobbled grooves is generally not in phase in the case of the actual optical disc. The wobbling amplitude may be selected depending on the particular format employed.

Figure 7:
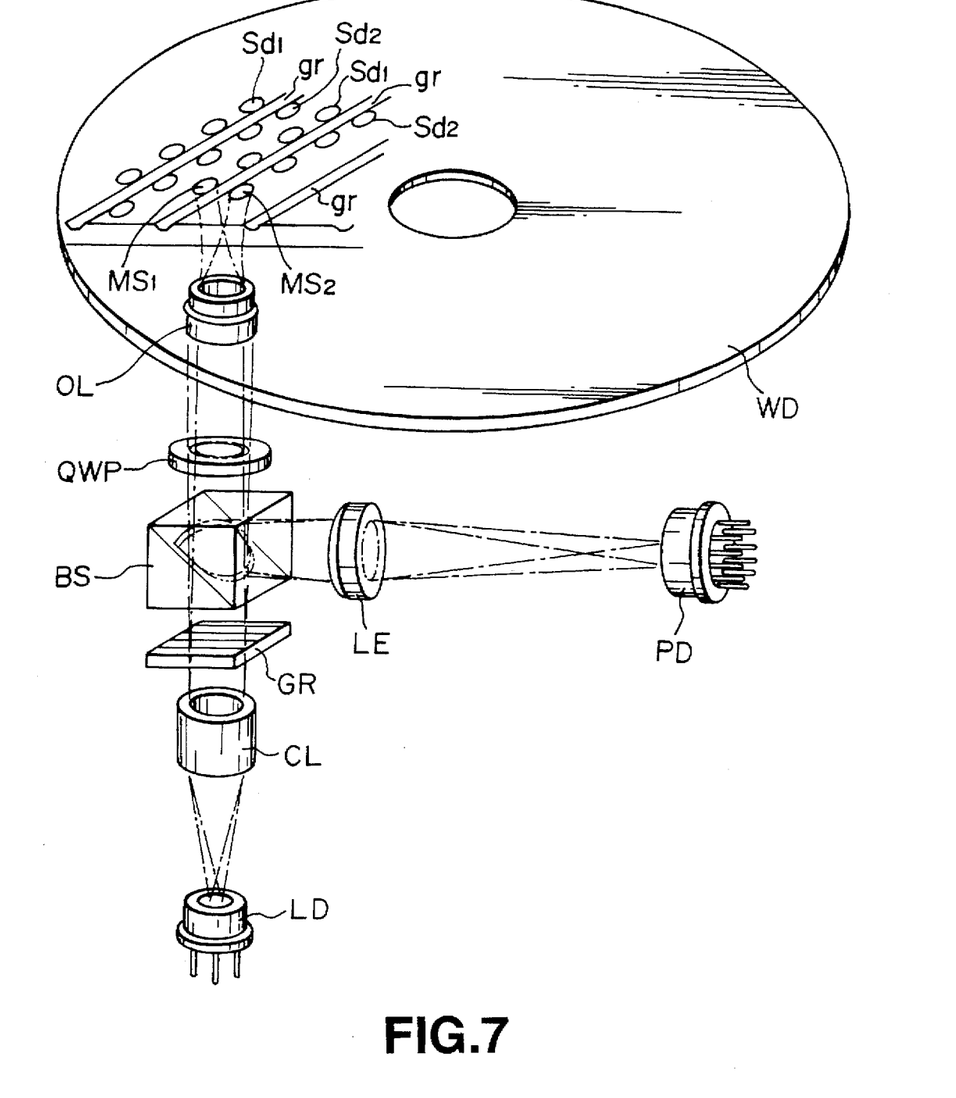
FIG. 7 is a schematic view showing a schematic arrangement of a critical portion, mainly an optical system, of an optical disc apparatus according to an embodiment of the present invention.

The optical disc apparatus of the present embodiment for simultaneously recording or reproducing the two-channel HDTV signal CH1 and CH2 on the pre-formatted optical disc WD is configured as shown in FIG. 7.

Referring to FIG. 7, the optical disc apparatus of the present embodiment, includes an optical system for radiating two main beam spots $MS_1$, $MS_2$, associated with the channels CH1 and CH2, respectively, on either sides of the two channels CH1 and CH2, and also radiating two side beam spots $SS_1$, $SS_2$ (see FIG. 9), associated with the two channels CH1 and CH2, respectively, on the groove gr. The optical disc apparatus also includes detection means (photodetector means PD) comprised of plural light receiving elements which receive the reflected light beams of the main spots $MS_1$ and $MS_2$ and the side spots $SS_1$ and $SS_2$ from the optical disc WD.

That is, with the optical disc apparatus of the present embodiment, the signals of the two channels CH1 and CH2 are recorded on or reproduced from the optical disc WD by the main spots $MS_1$ and $MS_2$ radiated onto the optical disc WD. On the other hand, focusing servo is performed based upon the reflected light of one or both of the main spots $MS_1$ and $MS_2$. Tracking servo is performed based upon the reflected light of the main spots $MS_1$ and $MS_2$ and the side spots $SS_1$ and $SS_2$.

The optical system of the present optical disc apparatus includes a semiconductor laser (laser diode LD) for generating two laser beams for the two channels CH1 and CH2. For the tracking servo, the so-called differential push-pull method as later explained is employed.

In FIG. 7, the grooves gr and the signal dots Sd are shown partially to an enlarged scale.

The optical disc apparatus of the present embodiment is now explained in detail.

Figure 8:
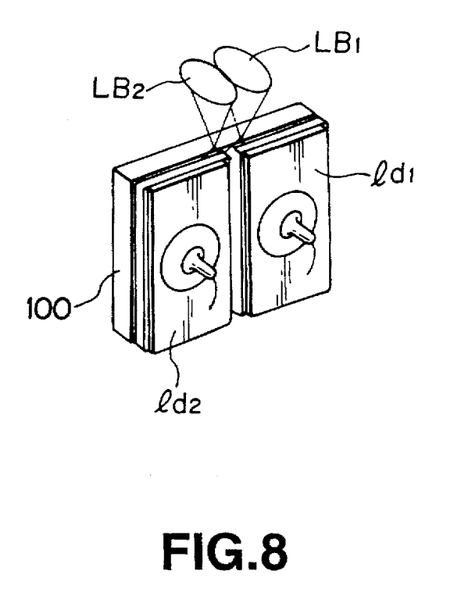
FIG. 8 is a perspective view showing a critical portion of a laser diode.

For recording or reproducing the signals of the two channels CH1 and CH2 on or from the optical disc WD simultaneously, the optical disc apparatus of the present embodiment employs a monolithic 2-channel laser diode in which the two channels may be driven independently of each other, as shown in FIG. 8. The laser diode LD, shown in FIG. 8, comprises two semiconductor laser elements $ld_1$, $ld_2$, mounted on a common indicating member 100, and adapted for radiating laser beams $LB_1$ and $LB_2$, respectively.

The two laser beams $LB_1$ and $LB_2$ from the laser diode LD are collimated by the collimator lens cell and split into, for example, a 0th order light and a 1st order light by a diffraction grating GR. The 0th order light and the ±1st order light of each of the laser beams $LB_1$ and $LB_2$ are transmitted through the beam splitter BS and the quarter wave plate QWP so as to be converged on the signal surface of the optical disc WD by the objective lens OL driven horizontally and vertically by a servo actuator, not shown.

Figure 9:
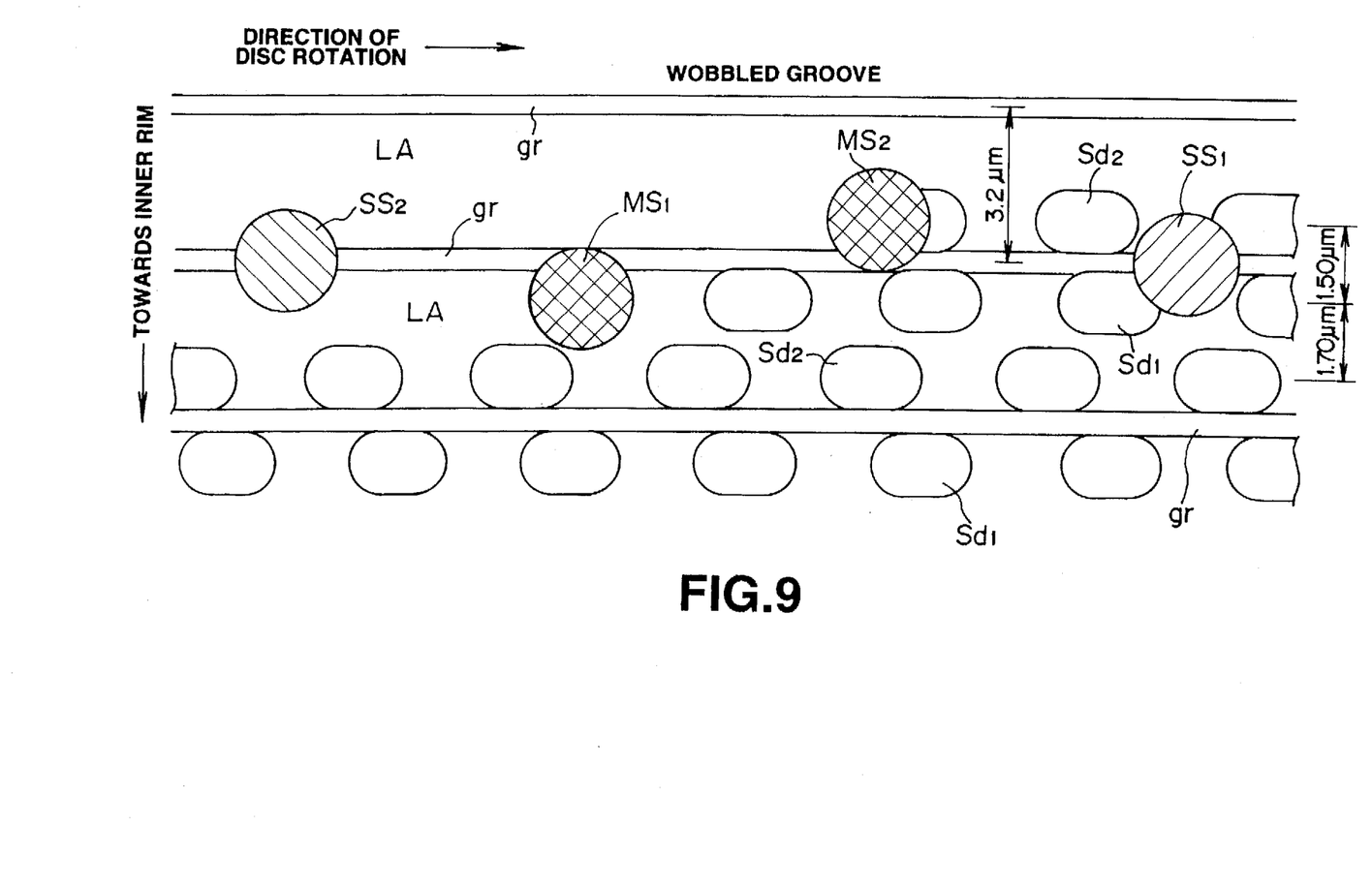
FIG. 9 shows the relative disposition between 2-channel signal dots, wobbled grooves and the main and side spots.
Figure 10A:
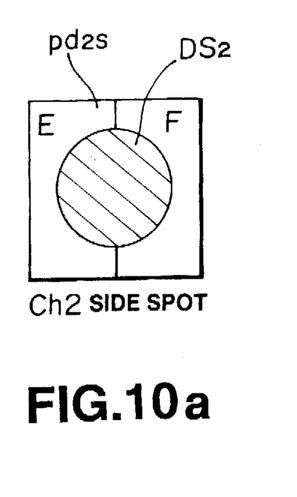
FIGS. 10(a) through 10(d) show each light receiver of a photodetector receiving the lights of the main and side spots.
Figure 10B:
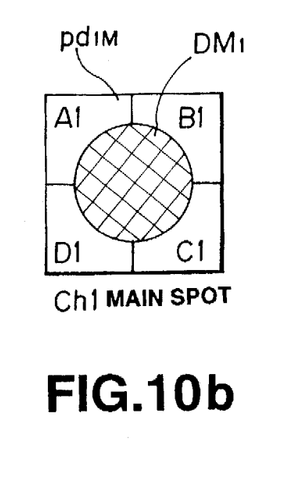
Figure 10C:
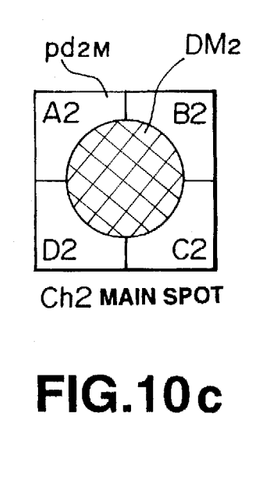
Figure 10D:
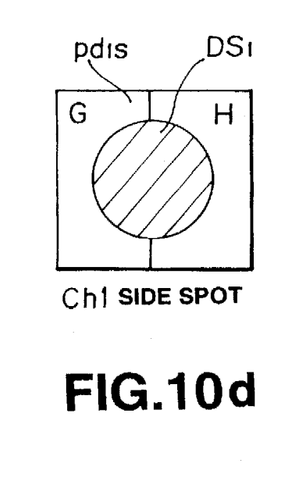

The 0th order light and ±1st order light of each of the two laser beams $LB_1$ and $LB_2$, converged on the signal surface of the optical disc WD, become the main spots $MS_1$ and $MS_2$ and the side spots $SS_1$ and $SS_2$ shown in FIG. 9. In the example of FIG. 9, the 0th order lights of the laser beams $LB_1$ and $LB_2$ become the main spots $MS_1$ and $MS_2$, respectively and the ±1st order lights of the laser beams $LB_1$ and $LB_2$ become the side spots $SS_1$ and $SS_2$, respectively.

In the present embodiment, the main spots $MS_1$ are radiated on the string of signal dots $Sd_1$ (track of signal dots) associated with the channel CH1 and the main spots $MS_2$ are radiated on the string of signal dots $Sd_2$ (track of signal dots) associated with the channel CH2. Also, in the present embodiment, regarding the ±1st order lights of the laser beam $LB_1$, the 1st order light converged on the groove gr sandwiched between the signal dots $Sd_1$ and $Sd_2$ is the side spot $SS_1$. On the other hand, regarding the ±1st order lights of the laser beam $LB_2$, the 1st order light converged on the groove gr sandwiched between the signal dots $Sd_1$ and $Sd_2$ is the side spot $SS_2$.

The light reflected from the signal surface of the optical disc WD is transmitted through the objective lens OL and the quarter wave plate QWP so as to be reflected by the beam splitter BS and transmitted via a lens LE, such as the above-mentioned cylindrical lens, to the photodetector PD.

The photodetector PD is made up of four light receivers $pd_{2S}$, $pd_{1M}$, $pd_{2M}$ and $pd_{1S}$, with the light receivers $pd_{1S}$ and $pd_{2S}$ being made up of two-segment light receiving elements E, F and G, H, respectively and with the light receiver $pd_{1M}$ and $pd_{2M}$ being made up of four-segment light receiving elements A1, B1, C1, D1 and A2, B2, C2, D2, respectively as shown at FIG. 10(a) to (d).

In the present optical disc apparatus, the reflected light associated with the 1st order light radiated on the groove gr of the channel CH1 of the optical disc WD is converged as a detection spot $DS_1$ on the light receiver $pd_{1S}$, the reflected light associated with the 1st order light radiated on the groove gr of the channel CH2 of the optical disc WD is converged as a detection spot $DS_2$ on the light receiver $pd_{2S}$, the reflected light associated with the 0th order light of the channel CH1 is converged as a detection spot $DM_1$ on the light receiver $pd_{1M}$, and the reflected light associated with the 0th order light of the channel CH2 is converged as a detection spot $DM_2$ on the light receiver $pd_{2M}$.

Consequently, with the present optical disc apparatus, the tracking servo and the detection of the tracking errors by the so-called differential push-pull method are performed by employing the detection signals from the two-segment light receivers $pd_{1S}$ and $pd_{2S}$ or the detection signals of the two-segment light receivers $pd_{1S}$ and $pd_{2S}$ and those of the four-segment light receivers $pd_{1M}$ and $pd_{2M}$ in their entirety, as will be explained subsequently.

The apparatus of the present embodiment also accurately controls the number of revolutions of the optical disc by the wobbled signals produced on the tracking error signals by the spindle servo circuit configuration, as will be explained subsequently.

In addition, the present apparatus converges the light spots on the signal surface of the optical disc using the detection signals from one or both of light receivers $pd_{1M}$, $pd_{2M}$, with the aid of a focusing servo technique, such as an astigmatic method.

When performing the tracking servo and the focusing servo, more assurance against disturbances may be provided by employing the four light receivers $pd_{1M}$, $pd_{2M}$, $pd_{1S}$ and $pd_{2S}$.

In the above-described embodiment, two signal channels are recorded on the optical disc WD. If it is desired to increase the number of channels, the number of the detectors on the photodetector PD is correspondingly increased. For example, with the four signal channels, the number of the main spots MS is four, so that the number of the light receivers on the photodetector PD associated with these four main spots is also four. However, it is unnecessary to increase the number of light receivers PD associated with the side spots with the increase in the number of the channels, such that the minimum number of the photodetectors associated with the side spots as required for the tracking servo suffices, such as two in the above embodiment.

In the present apparatus, the main spots $MS_1$, $MS_2$ of the 0th order light of the laser beams $LB_1$ and $LB_2$ are converged on the recording land LA of the optical disc WD by the focusing servo, and the 0th order light of the laser beams $LB_1$ and $LB_2$ is respectively radiated on either side of the groove gr.

The laser diode LD is driven based upon a signal produced by frequency modulation of the signals of the channels CH1, CH2 with the laser power sufficient to make recording on the optical disc WD, such as 7 mW on an average and 14 mW during the peak time. It becomes possible to form the signal dots $Sd_1$ and $Sd_2$ of the channels CH1 and CH2 on both sides of the groove gr. That is, it becomes possible to record the signals of the channels CH1 and CH2 on the optical disc WD.

When reproducing signals from the optical disc WD in the present apparatus, the two laser beams $LB_1$ and $LB_2$ are excited with a low dc power on the order of, for example, 1 mW which is not large enough to form the signal dots Sd. The tracking servo and the focusing servo are then performed in the same manner as described above, using the reflected light beams form the optical disc WD. The signals of the two channels are reproduced based upon the changes in the reflected light volume from the main spots $MS_1$, $MS_2$.

Figure 11:
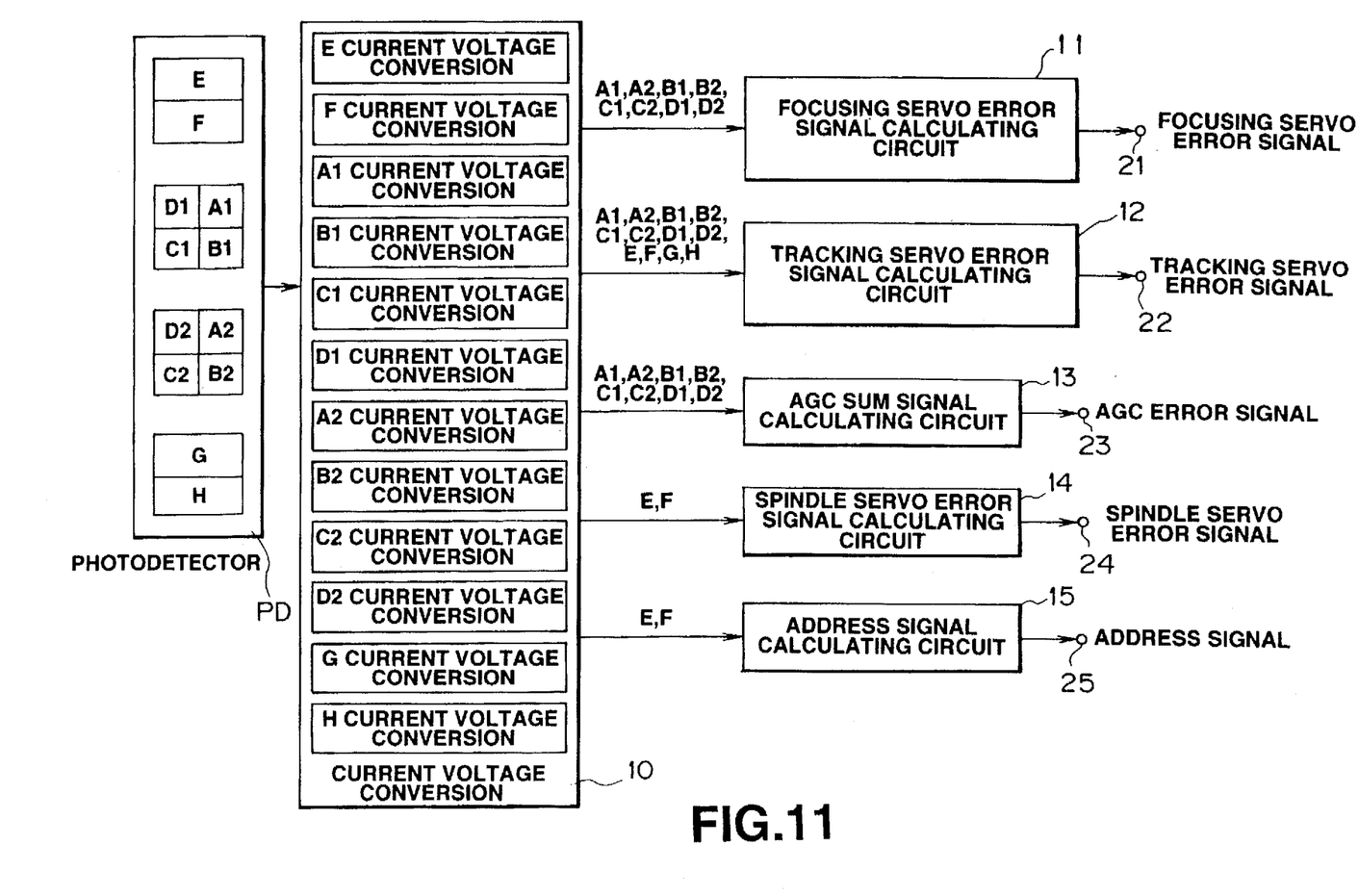
FIG. 11 is a block circuit diagram showing a schematic arrangement of a detection and processing circuit for various error signals in the servo circuit.
Figure 12:
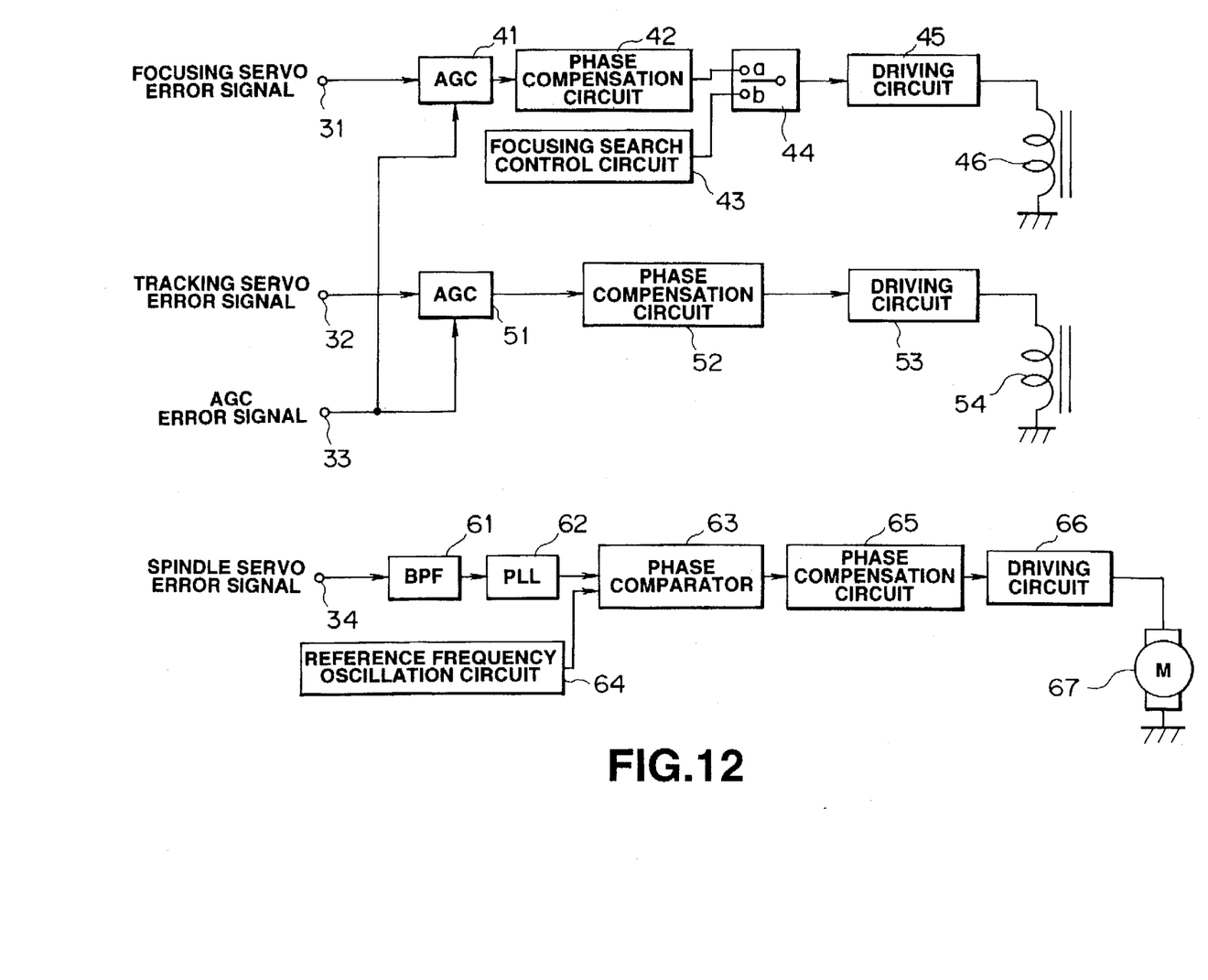
FIG. 12 is a block circuit diagram showing a schematic arrangement for performing various servo operations by various servo circuits.

The servo circuitry of the present optical disc apparatus for performing the tracking servo and the focusing servo of the optical disc apparatus is explained by referring to FIGS. 11 and 12.

In the servo circuitry of the present apparatus, signals from the photodetector of FIG. 11, which is the photodetector of FIG. 10, that is signals from the light receiving elements A1, B1, C1, D1; A2, B2, C2, D2; E, F, G, H are transmitted to a current to voltage converter 10. The current to voltage converter 10 is made up of current to voltage converting elements for converting signals indicated by the currents from the light receiving elements A1, B1, C1, D1, A2, B2, C2, D2, E, F, G and H, into corresponding voltage values.

Of the voltage outputs of the current to voltage converter 10, the voltage outputs associated with the light receiving elements A1, B1, C1, D1, A2, B2, C2 and D2 are transmitted to a focusing servo error signal calculating circuit 11, the voltage outputs associated with the light receiving elements A1, B1, C1, D1, A2, B2, C2, D2, E, F, G and H are transmitted to a tracking servo error signal calculating circuit 12. The voltage outputs associated with the light receiving elements A1, B1, C1, D1, A2, B2, C2 and D2 are also transmitted to a signal processing circuit for automatic gain control 13, while the voltage outputs associated with the light receiving elements E and F are transmitted to a spindle error signal processing circuit 14 and to an address signal processing circuit 15.

The focusing servo error signal processing circuit 11 processes the voltage outputs from the light receiving elements A1, B1, C1, D1, A2, B2, C2 and D2 with an arithmetic operation of (A1+C1)−(B1+D1)+(A2+C2)−(B2+D2) to produce a focusing servo error signal which is transmitted via a terminal 21 to a terminal 31 shown in FIG. 12.

The tracking servo error signal processing circuit 12 processes the voltage outputs from the light receiving elements A1, B1, C1, D1, A2, B2, C2, D2, E, F, G and H with an arithmetic operation of (A1+D1)−(B1+C1)+(A2+D2)−(B2+C2)−k{(E−F)+(G−H)}, where k>0, to produce a tracking servo error signal which is transmitted via a terminal 22 to a terminal 32 shown in FIG. 12.

The sum signal processing circuit for AGC 13 processes the voltage outputs from the light receiving elements A1, B1, C1, D1, A2, B2, C2 and D2 with an arithmetic operation of (A1+B1+C1+D1)+(A2+B2+C2+D2) for producing an error signal for AGC which is transmitted via a terminal 23 to a terminal 33 shown in FIG. 12.

The spindle servo error signal processing circuit processes the voltage outputs of the light receiving elements E and F with an arithmetic operation (E−F) to produce a spindle servo error signal which is transmitted via a terminal 24 to a terminal 34 of FIG. 12.

The address error signal processing circuit 15 processes the voltage outputs of the light receiving elements E and F with an arithmetic operation (E+F) to produce an address signal which is transmitted via a terminal 25 to a signal processor, not shown.

The focusing servo error signal, routed via the terminal 21 to the terminal 31 shown in FIG. 12, is transmitted to an AGC circuit 41 shown in FIG. 12. The AGC circuit 41 controls the gain of the focusing servo error signal based upon the error signal for AGC routed via the terminal 23 of FIG. 11 to the terminal 33 of FIG. 12. The focusing servo error signal, whose gain has been adjusted by the AGC circuit 41, is phase-compensated by a downstream side phase compensation circuit 42 and thence supplied to an input fixed terminal a of a changeover circuit 44. The changeover circuit 44 has its input fixed terminal b fed with a signal from a focusing search control circuit 43 and is switched between the focusing servo operation and the focusing search operation. An output of the changeover switch 44 becomes the focusing control signal supplied to a driving circuit 45 driving a focusing coil 46 in turn driving the objective lens OL in the vertical direction, that is in the direction orthogonal to the signal surface of the optical disc WD.

The tracking servo error signal supplied via the terminal 22 of FIG. 11 to the terminal 32 of FIG. 12 is transmitted to an AGC circuit 51 shown in FIG. 12. The AGC circuit 51 controls the gain of the tracking servo error signal based upon the error signal for AGC supplied via the terminal 23 of FIG. 11 to the terminal 33 of FIG. 12. The tracking servo error signal, processed with automatic error control by the AGC circuit 51, is phase-compensated in the phase compensation circuit 52 and becomes a tracking control signal. This tracking control signal is fed to a driving circuit 53 which drives a tracking coil 54 which in turn drives the objective lens OL in the horizontal direction, that is in the horizontal direction with respect to the signal surface of the optical disc WD.

The spindle servo error signal, supplied to the terminal 34 of FIG. 12 via the terminal 24 of FIG. 11, is band-limited by a band-pass filter (BPF) shown in FIG. 12 and phase-locked by a phase-locked loop (PLL) 62 before being transmitted to a phase comparator 63. The phase comparator 63 is also fed with a reference frequency signal for phase comparison from a reference frequency signal oscillation circuit 64 and performs phase comparison of the reference frequency signal with an output of the PLL circuit 62. Based on the results of phase comparison, the output of the PLL circuit 62 is phase-compensated by a downstream side phase compensation circuit 65. An output of the phase compensation circuit 65 becomes a spindle control signal fed to a driving circuit 66 which drives a spindle motor 67. The spindle motor 67 rotates the optical disc WD rotation.

In the present optical disc apparatus, a variety of the above-described servo operations are performed by the above-described servo circuitry.

With the above-described present embodiment, the optical disc WD is pre-formatted in such a manner that the wobbled grooves gr (including address information) are formed at an interval dependent on the number of channels. For instance, in the present two-channel embodiment (having channels CH1 and CH2) the interval is two times the groove pitch of a conventional optical disc. In the present embodiment, the wobbled grooves gr are therefore formed an interval of 3.2 μm which is two times the groove pitch of 1.6 μm for the conventional optical disc. The recording land for recording the signals thereon is formed between the adjacent grooves gr. The two channel HDTV signals CH1 and CH2 are respectively recorded on either sides of the grooves gr on the optical disc WD.

With the optical disc apparatus of the present embodiment, the HDTV signals may be recorded or reproduced on or from the optical disc WD for an extended period of time on a real time basis with the aid of an optical system employing the laser diode PD. The laser diode PD is capable of radiating the laser light beams associated with the two channel HDTV signals.

Thus it becomes possible with the present embodiment to trace plural light spots at a pre-set speed in accordance with the grooves gr on the optical disc WD, and to record or reproduce broad range HDTV signals by simultaneously recording or reproducing two independent picture signals in the vicinity of the grooves gr on the optical disc WD.

In addition, the optical disc of the present embodiment is pre-mastered so that the address information is included in the groove gr. There is no necessity of providing an additional optical system for recording only the address information, so that the system structure may be simplified as compared with the system in which the address information is recorded on a recording land apart from the groove gr. For reproduction, since the side spots $SS_1$ and $SS_2$ are used not only for tracking but also for reading out the addresses, there is no necessity of providing an additional optical system for reading only the address information.

In the present embodiment, since the address information data is provided in the groove for each set of plural channels formed by the HDTV signals, tracking may be achieved correctly and easily by utilizing the address information data. On the other hand, there is no risk of cross-talk of the address information data with another set of signals, such as a set of different signals of the plural channels therefore, so that recording/reproduction may be controlled satisfactorily. Above all, if the address information is provided in the groove, it is possible to minimize the risk of the address information data affecting the signals of the neighboring sets of signals, such as picture signals on the replay screen, even in the case of a CLV optical disc having the address information data offset relative to one another.

In addition, with the optical disc apparatus of the present embodiment, the tracking servo is performed with the aid of the differential push-pull method based upon the detection output by the photodetector PD of the reflected light from the optical disc WD of the main spots $MS_1$ and $MS_2$ and the side spots $SS_1$ and $SS_2$ split from the two laser beams $LB_1$ and $LB_2$ from the 2-beam laser diode LD. Therefore, the optical system for producing the tracking error signals may be simplified in structure. Besides, if the optical disc is radially inclined with respect to the optical axis of the objective lens, then a dc offset component tends to be produced in the resulting tracking error signal. However, since the differential push-pull method is used in the present apparatus, the resulting tracking error signal is freed of the dc offset component in order to follow up satisfactorily with the tracking state of the 0th order light of the laser light beams $LB_1$, $LB_2$ incident on the optical disc WD, despite the fact that the optical disc WD is radially inclined with respect to the optical axis of the objective lens. The radial inclination of the optical disc WD causes the 0th order light and the ±1st order light of the laser light beams $LB_1$, $LB_2$ to fall on the optical disc WD.

Figure 13:
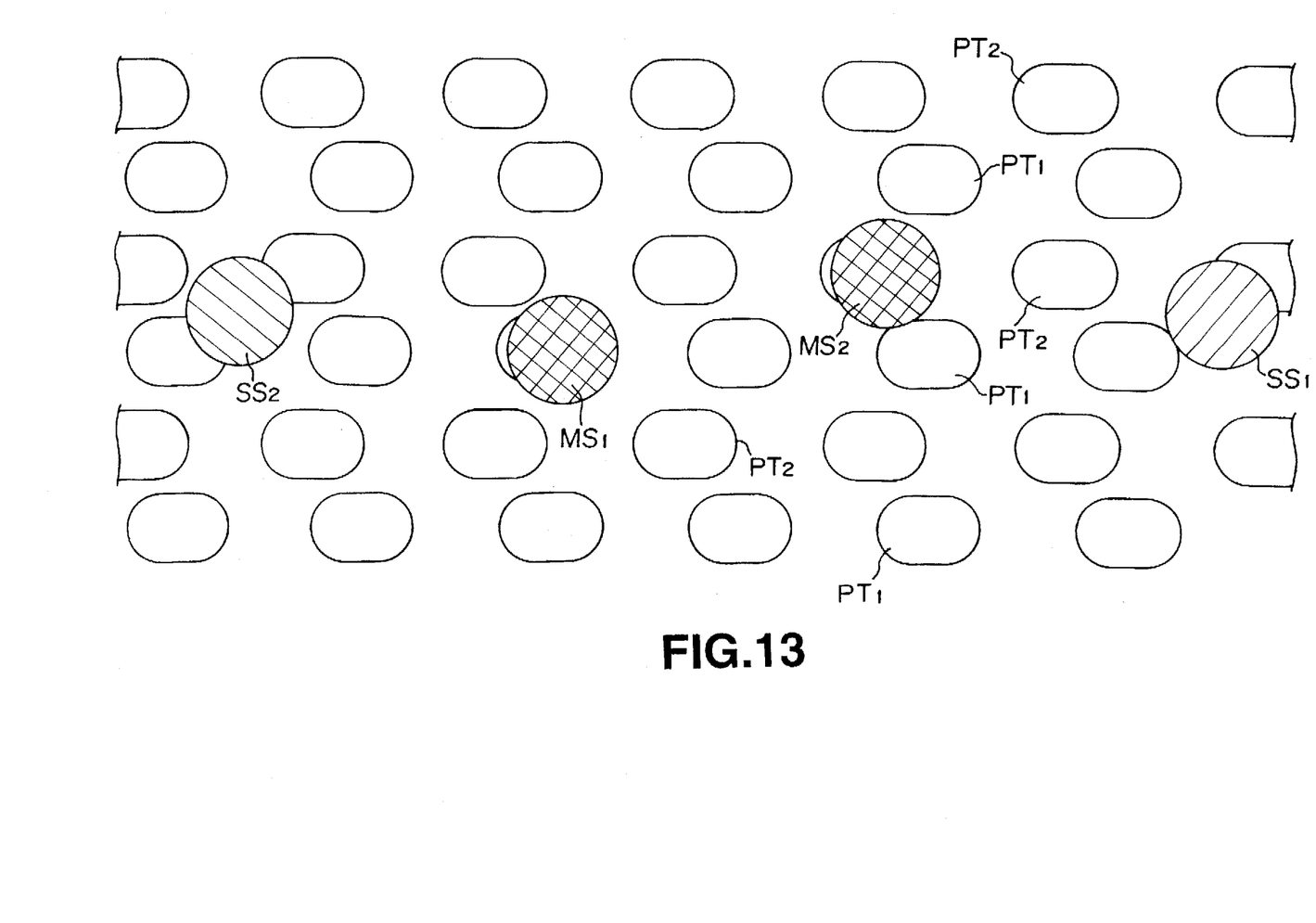
FIG. 13 shows an arrangement of main and side spots when a conventional replay-only optical disc is replayed by the optical disc apparatus of the present embodiment.

With the optical disc apparatus of the present embodiment, a replay-only optical disc, such as an optical disc not having the groove, may also be reproduced, as shown in FIG. 13. That is, if, in FIG. 13, the signal pits PT of the neighboring tracks are associated with the two channels CH1 and CH2, and signal pits $PT_1$ and $PT_2$ thus associated with these channels are traced by the main spots $MS_1$ and $MS_2$ in the same manner as described above, it becomes possible to reproduce the signals of the two channels CH1 and CH2. On the other hand, if tracking servo is performed so that the side spots $SS_1$ and $SS_2$ will trace the mid region between the signal pits $PT_1$ and $PT_2$, it becomes possible to effectuate tracking control with respect to the strings of the signal pits $PT_1$ and $PT_2$ of the main spots $MS_1$ and $MS_2$ and to effectuate focusing servo in the same manner as described above.

What is claimed is:

1. An optical disc system including:

an optical disc on which a recording area is formed; and an optical disc apparatus for recording an information signal on said optical disc;

wherein said optical disc has a plurality of wobbled grooves along tracks and recording lands defined between the wobbled grooves; and wherein said wobbled grooves include address information and a distance between each groove corresponds to a width of two channels of signals to be recorded;

said optical disc apparatus comprising:

laser means for emitting a pair of main laser beams and a pair of auxiliary laser beams and radiating said main and auxiliary laser beams to said optical disc;

detection means having plural light receivers for receiving the main and auxiliary laser beams reflected from the optical disc and for generating electrical signals; and tracking servo means for controlling a position of said laser means responsive to said electrical signals for performing tracking control such that each main laser beam of the pair of main laser beams is positioned on either side of a wobbled groove of the plurality of wobbled grooves; and wherein said laser means comprises a semiconductor laser emitting and radiating two laser beams, a collimator lens for collimating the two laser light beams radiated from said semiconductor laser, and a grating for splitting each of the two laser light beams incident thereon via said collimator lens into 0th order light and 1st order light used as the main and auxiliary laser beams.

2. The optical disc system as claimed in claim 1 wherein said tracking servo means effectuates tracking servo by a differential push-pull method.

3. An optical disc apparatus for recording information signals on an optical disc having a recording area for recording information signals therein in the form of recording lands defined between wobbled groves each formed along one of plural recording tracks on the optical disc, said wobbled groves including the address information, with the distance between the neighboring grooves corresponding to the width of two channels of signals, the optical disc apparatus comprising:

laser means for emitting a pair of main laser beams and a pair of auxiliary laser beams and radiating said main and auxiliary laser beams to said optical disc;

detection means having plural light receivers for receiving the main and auxiliary laser beams reflected from the optical disc and for generating electrical signals; and tracking servo means for performing tracking control responsive to the electrical signals such that each main laser beam of the pair of main laser beams is positioned on either side of a wobbled groove of the plurality of wobbled grooves; and wherein said laser means comprises a semiconductor laser emitting and radiating two laser beams, a collimator lens for collimating the two laser light beams radiated from said semiconductor laser, and a grating for splitting each of the two laser light beams incident thereon via said collimator lens into 0th order light and 1st order light used as the main and auxiliary laser beams.

4. The optical disc apparatus as claimed in claim 3 wherein said tracking servo means effectuates tracking servo by a differential push-pull method.

* * * * *

UNITED STATES PATENT AND TRADEMARK OFFICE
CERTIFICATE OF CORRECTION

PATENT NO.:     5,754,505
DATED:          May 19, 1998
INVENTOR(S):    HIROSHI SAEKI

It is certified that errors appear in the above-identified patent and that said Letters Patent is hereby corrected as shown below:

In Col. 11, line 9, please replace "groves" with --grooves--;

In Col. 11, line 11, please replace "groves" with --grooves--.

Signed and Sealed this

Twentieth Day of October, 1998

Attest:

BRUCE LEHMAN

Attesting Officer    Commissioner of Patents and Trademarks